United States Patent [19]

Downing et al.

[11] Patent Number: 5,162,168

[45] Date of Patent: Nov. 10, 1992

[54] AUTOMATIC VOLTAGE CONTROL SYSTEM AND METHOD FOR FORCED ELECTROLYTE FLOW BATTERIES

[75] Inventors: Robert W. Downing; Donald V. Conte, both of Fort Wayne; David Ramon, Columbia City, all of Ind.

[73] Assignee: Magnavox Electronic Systems Company, Fort Wayne, Ind.

[21] Appl. No.: 746,834

[22] Filed: Aug. 19, 1991

[51] Int. Cl.$^5$ ............... H01M 2/38; H01M 10/48
[52] U.S. Cl. ................................. 429/51; 429/64; 429/72; 429/92
[58] Field of Search ............ 429/51, 64, 63, 72, 429/81, 91, 92, 110, 119, 61, 62

[56] References Cited

U.S. PATENT DOCUMENTS

| | | | |
|---|---|---|---|
| 2,921,111 | 1/1960 | Crowley et al. | 429/64 X |
| 3,012,087 | 12/1961 | Billiard et al. | 429/64 |
| 3,470,032 | 9/1969 | Egan | 429/119 |
| 3,542,598 | 11/1970 | White et al. | 429/64 |
| 3,607,428 | 9/1971 | Marzolf | 429/64 |
| 3,996,579 | 12/1976 | Dahl | 429/92 X |
| 4,957,828 | 9/1990 | Garron | 429/92 |

Primary Examiner—Anthony Skapars
Attorney, Agent, or Firm—Roger M. Rickert; Richard T. Seeger

[57] ABSTRACT

In a preferred embodiment, voltage control system and method which include providing voltage sensing and control circuitry which measures the output voltage of a battery and provides an output signal to a flow control valve to cause the flow control valve to reduce the rate of flow of electrolyte when the output voltage of the battery is below a desired level and to cause the flow control valve to increase the rate of flow of electrolyte when the output voltage of the battery is above a desired level. The flow control valve may be a binary controlled solenoid valve responsive to a pulse-width-modulated signal from the sensing and control circuitry.

7 Claims, 3 Drawing Sheets

AUTOMATIC VOLTAGE CONTROL SYSTEM AND METHOD FOR FORCED ELECTROLYTE FLOW BATTERIES

BACKGROUND OF THE INVENTION

1. Field of the Invention

The present invention relates to forced electrolyte batteries generally and, more particularly, but not by way of limitation, to a novel system and method for controlling the output voltage of such batteries by controlling the rate of flow of electrolyte therethrough.

2. Background Art

Forced electrolyte flow batteries are employed, for example, in underwater applications such as in the powering of sonobuoys, in which seawater is used as the electrolyte for the batteries. The flow of seawater may be caused by thermal and density differences or it may be caused by a pump.

Heretofore, output voltage of such batteries has been controlled by means of conventional voltage regulators. Voltage regulators are disadvantageous, however, in that they generally consume a relatively high level of power and are not entirely reliable.

It is known that the output voltage of such a battery is proportional to the rate of flow of electrolyte therethrough, due to the change in operating temperature of the battery as the flow of electrolyte varies.

Accordingly, it is a principal object of the present invention to provide system and method for controlling the output voltage of batteries of the type having a flow of electrolyte therethrough, the system and method controlling the voltage by varying the rate of flow of electrolyte therethrough.

It is another object of the invention to provide such system and method that are simple, reliable, and economical.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, voltage control system and method which include providing voltage sensing and control circuitry which measures the output voltage of a battery and provides an output signal to a flow control valve to cause the flow control valve to reduce the rate of flow of electrolyte when the output voltage of the battery is below a desired level and to cause the flow control valve to increase the rate of flow of electrolyte when the output voltage of the battery is above a desired level. The flow control valve may be a binary controlled solenoid valve responsive to a pulse-width-modulated signal from the sensing and control circuitry.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Figure 1:
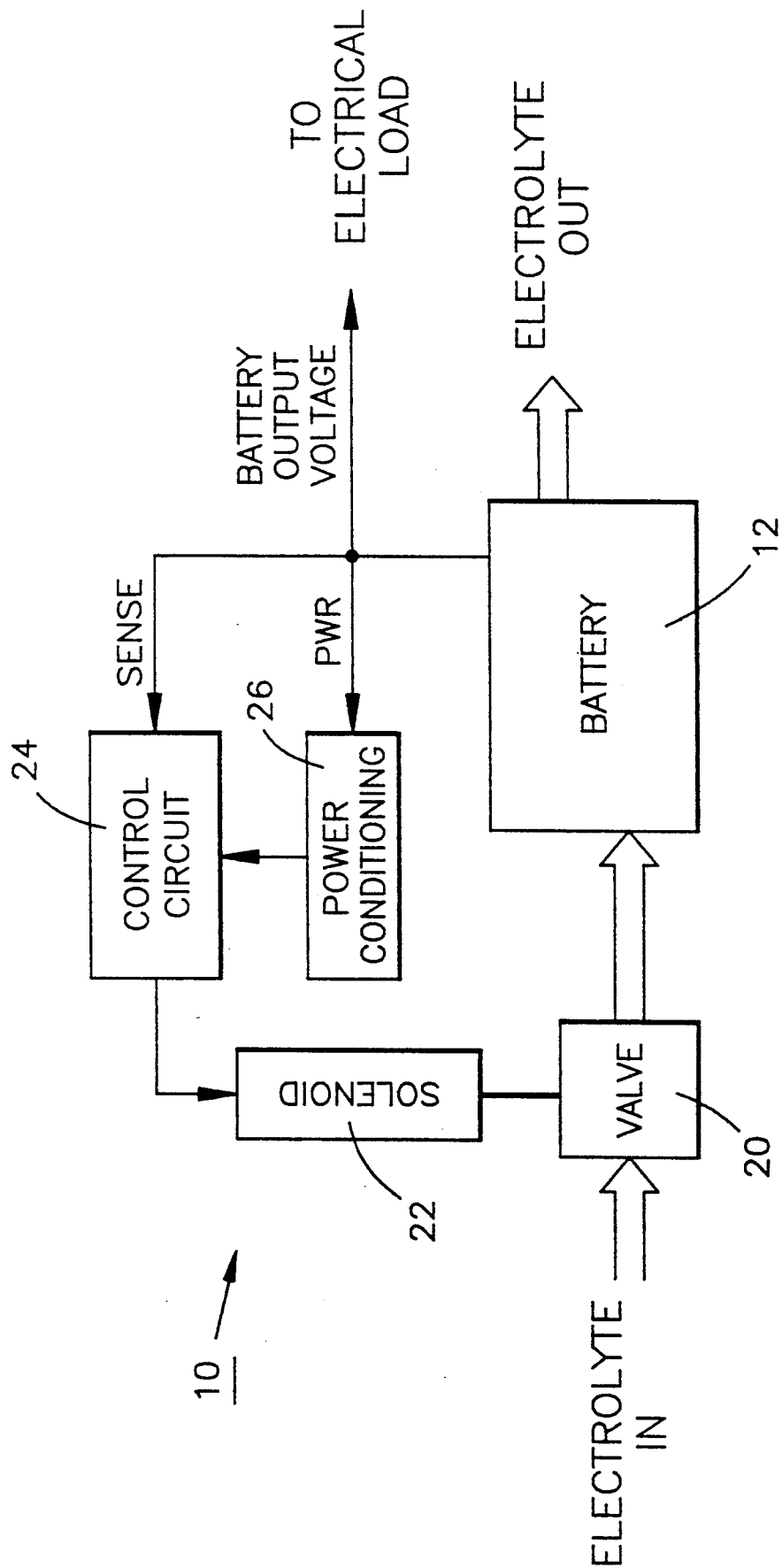
FIG. 1 is a block diagram illustrating the elements of a voltage control system according to the present invention.

Referring now to the Drawing, in which similar or identical elements are given consistent identifying numerals throughout the various figures thereof, FIG. 1 illustrates a battery output voltage control system, generally indicated by the reference numeral 10, connected to a battery 12 to control the level of output voltage therefrom. Battery 12 is of the type which requires a flow of electrolyte therethrough and it may be assumed that the electrolyte thereto is furnished from a pressurized source (not shown).

The element controlling the flow of electrolyte to battery 12 is a valve 20 actuated by an electric solenoid 22. Solenoid 22 is responsive to a pulse-width-modulate output from a control circuit 24. Valve 20 is thus under binary control, being open for a first selected period of time following which the valve is closed of a second selected period of time. Control circuit 24 receives a voltage sense input from the output of battery 12 and receives operating power from a power conditioning circuit 26 connected to the output of the battery.

As noted above, the output of battery 12 is proportional to the flow of electrolyte therethrough, as the electrolyte affects the internal temperature of the battery, with higher temperatures producing higher output voltages and vice versa. Thus, higher flow rates of electrolyte tend to cool the battery and produce lower output voltages, while lower flow rates of electrolyte tend to warn the battery and produce higher output voltages. In one preferred embodiment, the output of control circuit 24 has a fixed period of two seconds and a variable duty cycle, with a duty cycle of 50 percent when the output voltage from battery 12 is at the defined nominal value.

Figure 2:
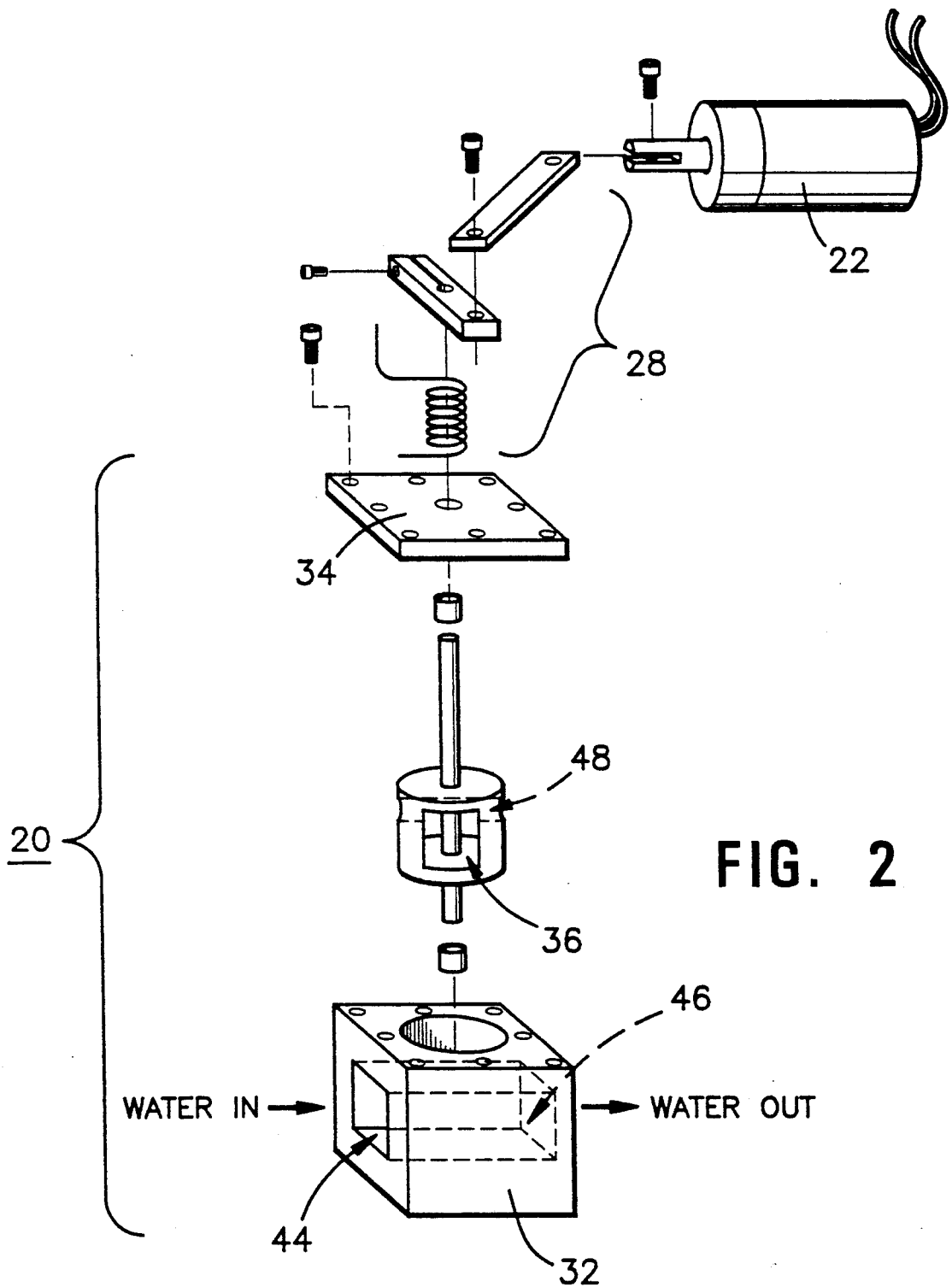
FIG. 2 is an exploded perspective view of a solenoid valve used in the system of FIG. 1..

Referring now to FIG. 2, there is depicted valve 20 and solenoid 22 joined by a spring/linkage, generally indicated by the reference numeral 28. Valve 20 includes a rotatable plug 30 journalled in a body 32 having a lid 34. plug 30 includes a channel 36 defined therethrough and orthogonal to the major axis thereof. Spring/linkage 28 is arranged such that energization/de-energization of solenoid 22 will rotate plug 30 between the closed position shown on FIG. 2, when the solenoid is energized, to an open position (not shown) with channel 36 aligned with an inlet 44 and an outlet 46 in body 32 to permit flow of electrolyte through valve 20 to battery 12 (FIG. 1), when the solenoid is de-energized. Channel 36, inlet 44, and outlet 46 are rectangular and have greater-than-unity height-to-width ratios in order to reduce the amount of rotation required to move plug 30 between the open and closed positions, thus reducing power requirements.

With valve 20 in the closed position, it is neither necessary nor desirable to have zero flow to battery 12. Such batteries generate reaction products which, if not swept out of the cells by the flow of electrolyte, would clog the cells, resulting in battery shutdown. In a low voltage situation, which could result from heavy electrical loading and/or cold electrolyte, control circuitry 24 (FIG. 1) may keep the valve continuously closed in an effort to increase the voltage, thus aggravating the situation. It is thus mandatory that there be some flow when valve 20 is closed. This minimum flow may be provided by having plug 30 loose fitting within body 32 or by providing an auxiliary channel 48 defined through the body generally orthogonal to the axis of channel 36 to provide the minimum flow when valve 20 is in the closed position.

Figure 3:
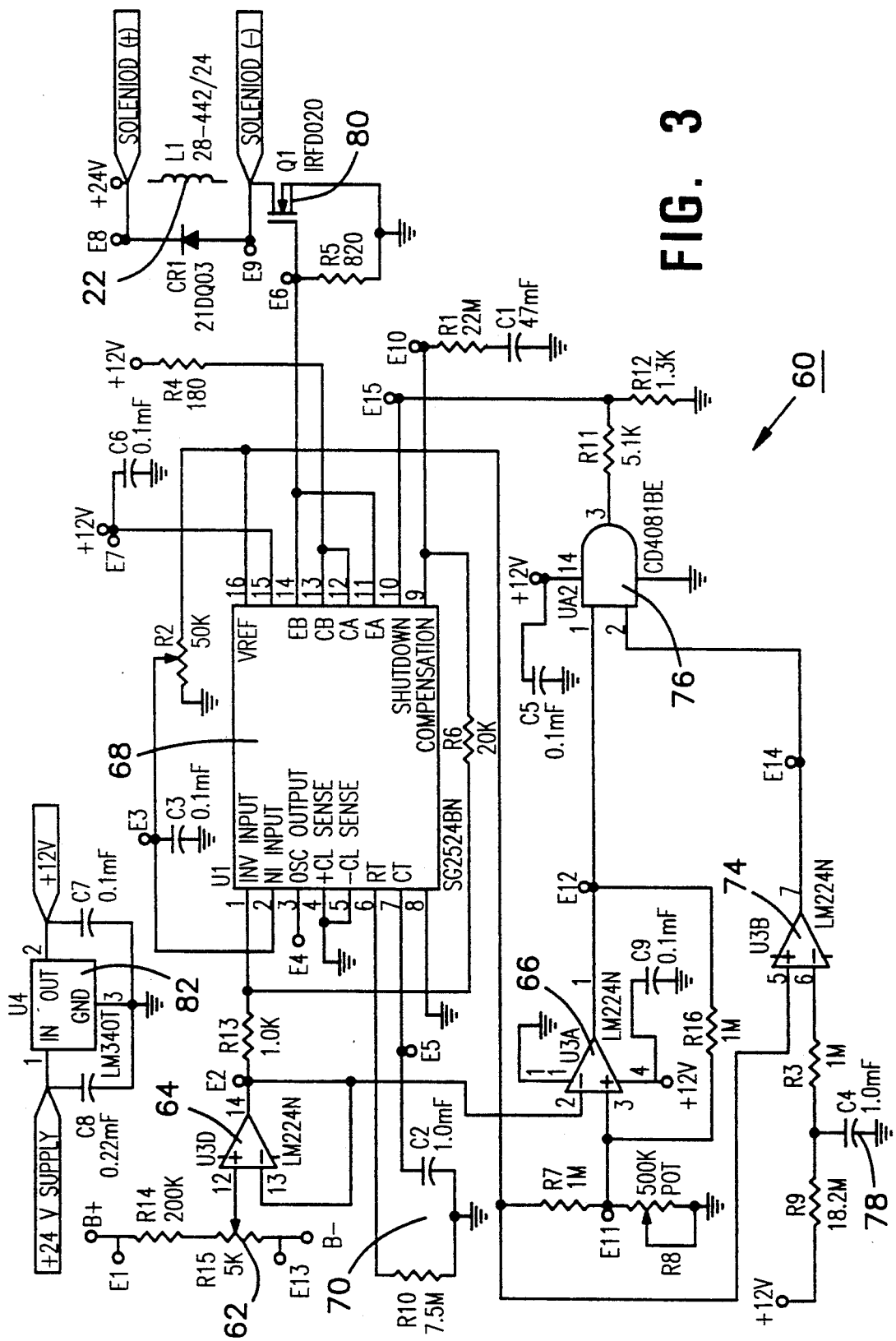
FIG. 3 is a schematic diagram of the power conditioning and control circuitry of the system of FIG. 1.

Referring now to FIG. 3, there is shown control and voltage conditioning circuitry, generally indicated by the reference numeral 60, corresponding to control circuitry 24 and power conditioning circuitry 26 of FIG. 1.

Circuitry 60 includes a voltage divider 62, connected across terminals "B+" and "B−" of battery 12 (FIG. 1) (typically 140 volts), which restricts sensing current to aproximately 1 mA. The ratio of voltage divider 62 is chosen to provide a level of 2.5 volts when the battery terminal voltage is at its nominal value. The output voltage from voltage divider 62 is buffered with an operational amplifier 64 configured as a unity gain voltage follower before being fed to both a level detector 66 and an error amplifier resident on a pulse width modulation (PWM) chip 68.

upon start-up. solenoid 22 is initially de-energized (valve 20, FIG. 1, open ) while electrolyte fills battery 12. The solenoid control voltage portion of circuitry 60 remains disabled (valve open) until level detector 66 senses 2.2 volts (battery voltage 88 percent of nominal) or until a timer 74 has completed a 10-second timeout. Whenever the first of these events occurs, the solenoid control voltage portion of circuitry 60 begins normal operation.

The outputs of level detector 66 and a timer 74 are inputs to an AND gate 76 the output of which is coupled to the shutdown control (pin 10) of PWM chip 68. A 2.2-volt reference, derived from the 5-volt reference of PWM 68, is utilized by level detector 66 for comparison with battery voltage. When proportional battery voltage rises to 2.2 volts, the output of level detector 66 will make a high-to-low transition.

Timer 74 compares the 5-volt reference of PWM 68 with a ramp voltage waveform generated by a series RC circuit 78 coupled to the 12-volt supply. The time constant of RC circuit 78 is designed to force timer 74 to make a high-to-low transition 10 seconds following battery activation . PWM chip 68 is shut down (disabled) whenever both the output of level detector 66 is high (the proportional battery voltage is less than the reference voltage) and the output of timer 74 is high (elapsed time is less than 10 seconds). As soon as either output goes low, PWM 68 is released from shutdown and normal operation begins. Since timer 74 is connected as a one-shot type of arrangement, PWM 68 will never again be shut down as long as there is sufficient battery voltage available to power circuitry 60.

PWM chip 68 operates at a frequency of 0.5 Hz (2-second period) and produces pulse-width modulation as a function of proportional battery voltage. A 2.5-volt reference, derived from the 5-volt reference of PWM chip 68, is compared with proportional battery voltage at the PWM chip error (difference) amplifier. The output of the error amplifier is compared to the oscillator capacitor charging voltage waveform. The capacitor is part of RC circuit 70 establishing oscillator frequency of PWM chip 68. The output of the comparator of PWM chip 68 (pin 14) is a pulse whose width is a function of the threshold difference between the error amplifier voltage and the capacitor's voltage ramp waveform. Error amplifier voltage extremes are from 0 volts to 4.3 volts which, when compared to oscillator ramp voltage, result in nearly 0 percent to 100 percent duty cycle pulse waveforms, respectively, at the output of PWM chip 68. With the reference of the error amplifier set at an equivalent nominal battery output voltage and the error amplifier closed-loop gain set at 20, the pulsed waveform duty cycle varies from approximately 100 percent (valve 20 continuously closed) for battery voltages less than 96 percent nominal to 0 percent (valve continuously open) for battery voltages greater than 104 percent nominal. The output of PWM chip 68 is buffered by an N-channel MOSFET 80 to drive solenoid 22.

Power for circuitry 60 and solenoid 22 is derived from the battery being controlled. The battery voltage is converted to 24 VDC by a DC-DC converter (not shown). The 24-volt output of the converter is used to power solenoid 22 and also supplies input power to a linear regulator 82 which provides 12 VDC to power circuitry 60. All the circuitry, except for the DC-DC converter, can be mounted on a single, relatively small, printed wiring board (not shown).

While the present invention has been described as employing a valve having binary control, it will be understood that, with appropriate changes to the control circuitry, an analog valve could be employed as well. However, the use of the solenoid controlled valve results in a more economical, more efficient system.

Binary control will, of course, cause an intermittent flow of electrolyte through a battery; however, thermal lag in the battery tends to even out what otherwise would be fluctuations in temperature. This intermittent flow actually has an advantage in helping to dislodge corrosion products, thereby facilitating their removal from the battery.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. An automatic voltage control system for a battery of the type having a flow of electrolyte therethrough, comprising:
   (a) flow control means including a flow control valve having "on" and "off" positions to vary said flow of electrolyte through said battery; and
   (b) voltage sensing and control circuitry coupled to said flow control means to sense the level of output voltage of said battery, said voltage sensing and control circuitry including pulse width modulation circuitry to cause said flow control means to reduce the rate of said flow of electrolyte when said output voltage of said battery is below a desired level and to cause said flow control means to increase the rate of said flow of electrolyte when said output voltage of said battery is above a desired level by selectively cycling said flow control valve between said "on" and "off" positions.

2. An automatic voltage control system, as defined in claim 1, wherein said flow control valve comprises a solenoid operated valve.

3. An automatic voltage control system, as defined in claim 1, wherein said flow control valve passes a selected minimum flow of said electrolyte to said battery when said flow control valve is in said "off" position.

4. A method of automatically controlling the output voltage of a battery of the type having a flow of electrolyte therethrough, comprising: sensing the level of output voltage of said battery and reducing the rate of said flow of electrolyte when said output voltage of said battery is below a desired level and increasing the rate of said flow of electrolyte when said output voltage of said battery is above a desired level, said reducing or increasing the rate of said flow of said electrolyte including providing a pulse-width-modulated signal to flow control means to cause said flow control means to selectively cycle between "on" and "off" positions.

5. A method of automatically controlling the output voltage of a battery, as defined in claim 4, further comprising: providing as said flow control means a solenoid operated valve.

6. A method of automatically controlling the output voltage of a battery, as defined in claim 4, further comprising: providing a selected minimum flow of said electrolyte to said battery when said flow control means is in said "off" position.

7. A method of automatically controlling the output voltage of a battery, as defined in claim 4, further comprising: providing an intermittent flow of said electrolyte to said battery such as to assist in dislodging corrosion products and thus facilitating removal of said corrosion products from said battery.

* * * * *